Figure 1:
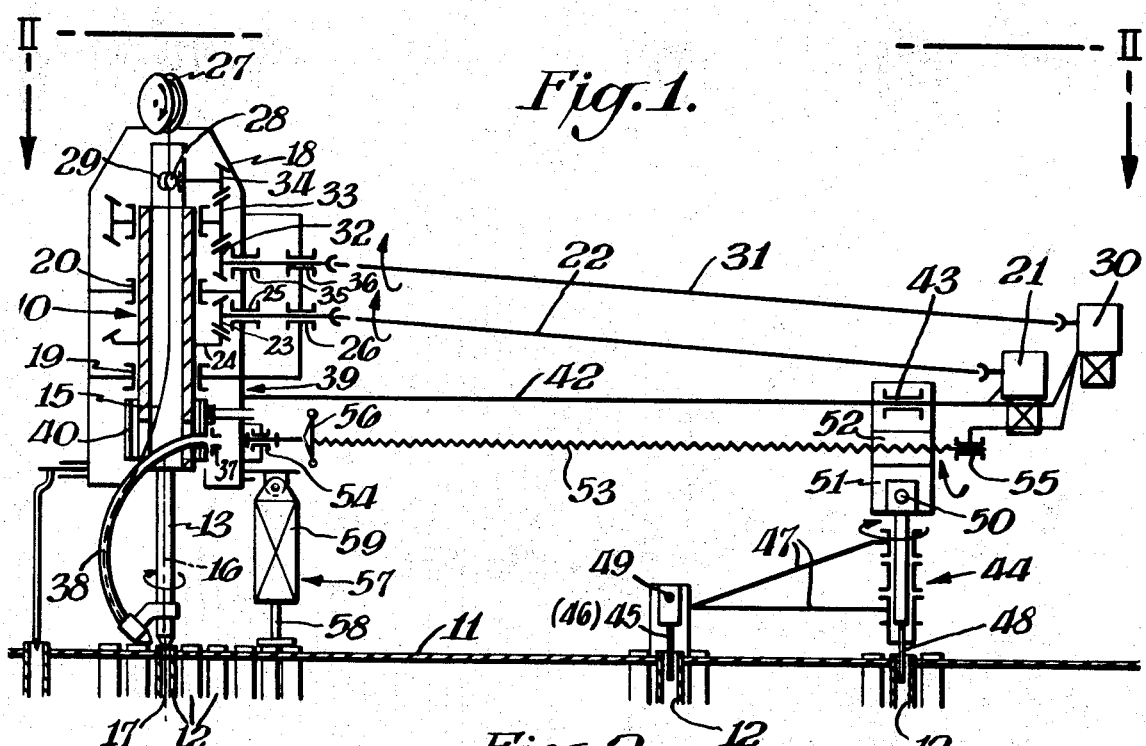

United States Patent

[11] 3,560,701

| [72] | Inventor | Siegfried Hahne<br>Grafschafterstr, Germany (Messer<br>Griesheim GmbH Frankfurt am Main<br>Hanauer Landstr. 300 Germany) |
|------|----------|---|
| [21] | Appl. No. | 769,449 |
| [22] | Filed | Sept. 10, 1968 |
| [45] | Patented | Feb. 2, 1971 |
| [32] | Priority | Oct. 14, 1967 |
| [33] | | Germany |
| [31] | | 75,887 |

[54] DEVICE FOR WELDING TUBES TO PLATES
12 Claims, 2 Drawing Figs.

| [52] | U.S. Cl. | 219/125 |
|------|----------|---------|
| [51] | Int. Cl. | B23k 9/12 |
| [50] | Field of Search | 219/125, 124, 126, 60, 60.1; 228/25, 29 |

[56] References Cited

UNITED STATES PATENTS

| 3,209,120 | 9/1965 | Glatthorn | 219/125 |
| 2,818,493 | 12/1957 | Pilia et al. | 219/125 |
| 3,064,120 | 11/1962 | Ache | 219/125 |
| 3,119,009 | 1/1964 | Zeller | 219/125 |
| 3,268,707 | 8/1966 | Thomas | 219/125 |

FOREIGN PATENTS

| 1,333,009 | 9/1962 | France | 219/125 |

*Primary Examiner*—J. V. Truhe
*Assistant Examiner*—L. A. Schutzman
*Attorney*—Connolly and Hutz

ABSTRACT: A device for the automatic welding of tubes or the like to plates or the like includes a welding unit and a holding unit connected together by a crossbar. The device is characterized by having the holding unit supported on the work piece per se.

3,560,701

DEVICE FOR WELDING TUBES TO PLATES

BACKGROUND OF INVENTION

The invention relates to a device for the automatic welding of pipes, rods, and the like, in plate bottoms, tin plates and the like, consisting of a welding —and a holding device which are connected to each other by means of a crossbar.

Apparatus of the above-named type are preferably used for the welding of pipes in plate bottoms for heat exchangers. In this connection it is desirable that as many pipes as possible are welded per time element and that the welding is with uniform seam quality.

The time element requirement necessitates an easy movability of the apparatus, while a uniform welding seam quality is assured only by a careful adjustment of the apparatus compared with the pipe to be welded in. Both requirements are generally incompatible.

From German design Pat. No. 1,898,261 for example a welding device is known where the turnable welding head is supported in a horizontal plate bar which has vertically positioned handles. The entire welding device can be moved by hand from one welding point to the next, in which case each time the complete weight of the apparatus must be overcome. It is obvious that this sets narrow limits on the measurements and the weight of the apparatus, so that it should be suitable for the welding of pipes of relatively small diameter. A further disadvantage of the known apparatus is in the difficulty of welding pipes into vertically positioned plate floors. In this connection during the welding process the apparatus must be constantly held and pressed hard against the plate floor.

SUMMARY OF INVENTION

The object of this invention is to avoid the above disadvantages and to provide a device which can be quickly moved without much energy consumption from one welding point to the next and which in addition is suitable for nearly any desired diameter of the objects to be welded (pipes or rods). In order to solve this problem, it is essentially proposed by the invention that the holding device be supported at the workpiece per se and be attached thereto.

With the novel device, pipes of all diameters can be welded into plate floors, since practically no limit is set to the measurements and the weight of the device. In practice, pipe diameters of 15 to 100 mm. are provided.

In particular, it is further proposed that the holding device be supported in the already welded in pipe ends or in the borings provided for the pipe ends.

Stabilizing can then take place in that the holding device has three columns which reach into the pipe ends and that two columns of the holding device are braced against each other.

Such a holding device, attached at the workpiece per se, is particularly well suited for large workpieces. It is easily detachable and requires no specific position of the workpiece.

The transporting of the device from one welding point to the next is considerably simplified, according to a further suggestion of the invention, in that at the holding device the crossbar is hinged or swingable in two planes perpendicular to each other. In this connection a vertical and subsequently a lateral swinging of the crossbar about its joint at the holding device, for example, is sufficient. The vertical swinging can take place with the aid of a hydraulic lifting device or even by hand. The lifting power to be applied is suitably decreased by counterweights at the crossbar on the other side of the joint.

Advantageously, the motors for driving the welding head as well as for the welding wire advance serve as the counterweight. The novel device is thus equally suitable for welding pipes or tubes in horizontal as well as in vertical bottoms, since its own weight, even in the latter instance, is fully supported by the joint of the holding device.

The welding of pipe ends in base plates can take place for example in such a manner that in a certain adjustment of the holding device, all welding points, arranged on an arc around the joint of the crossbar, can be handled. Subsequently then the holding device is disengaged and again attached at another side, etc. However, it is more suitable to leave the holding device always at the same place and to construct adjustably the distance of the welding head from the joint of the crossbar.

Specifically, in this connection it is novelly proposed that a rod serve as the crossbar which is adjustable in a longitudinal direction in a tube connected with the joint.

In order to assure an easy adjustability of the crossbar, it is recommended to support the crossbar on ball bearings. For adjusting the distance of welding head to joint, a worm gear spindle is suitable which is turnably supported at the welding head and is engaged with a spindle nut, which in turn is connected with the joint.

The adjustment may be done by hand, whereupon a handwheel is provided on the spindle. With a corresponding dimensioning of the crossbar, the device can then have a radius of action of up to 1000 mm.

The welding head is rotatable compared with respect to the crossbar. According to the invention it is proposed in this connection that the crossbar be attached to a housing in whose interior the welding head is turnably supported.

As has already been indicated above the motors for driving the welding head and for the welding wire advance can at the same time function as the counterweight at the crossbar. This requires, however, that the motors be situated relatively remote from the welding head. For transmission of power between motors and welding head, drive shafts are proposed which are in a position to equalize longitudinal movements of the crossbar by means of simple angle changes of the joints, so that thereby the drive remains unimpaired by the welding head and wire advance.

The novel device, according to its function, can be divided into two parts:

1. The holding device with the crossbar and the driving motors.
2. The actual welding head with the welding wire advance device and the terminals for electric current and if necessary protective gas.

The housing serving for the mounting of the rotating welding head contains the supports for the propeller shafts and furthermore encloses the gears for driving the welding head as well as for the wire advance.

The elevating mechanism, which serves for swinging the crossbar in a vertical direction, may also be attached at the housing. In addition, it is inventively proposed that handles be arranged at the housing for the swinging of the crossbar with the welding head attached thereto in a horizontal and if necessary also in a vertical plane.

From the above, the intention of the invention is clear to arrange all parts not rotating with the welding head to the housing. The turning bulk of the rotating welding head is advantageously kept low thereby, and as a result correspondingly low driving powers are required.

Meanwhile, it is very suitable on the following grounds if the welding wire advance arrangement in the turning direction of the welding head is firmly connected thereto. The welding head thus operates faultlessly, i.e. it can carry out any number of rotations in the same direction without distortion of the welding wire or the supply cable by current and protective gas.

THE DRAWINGS

Figure 2:
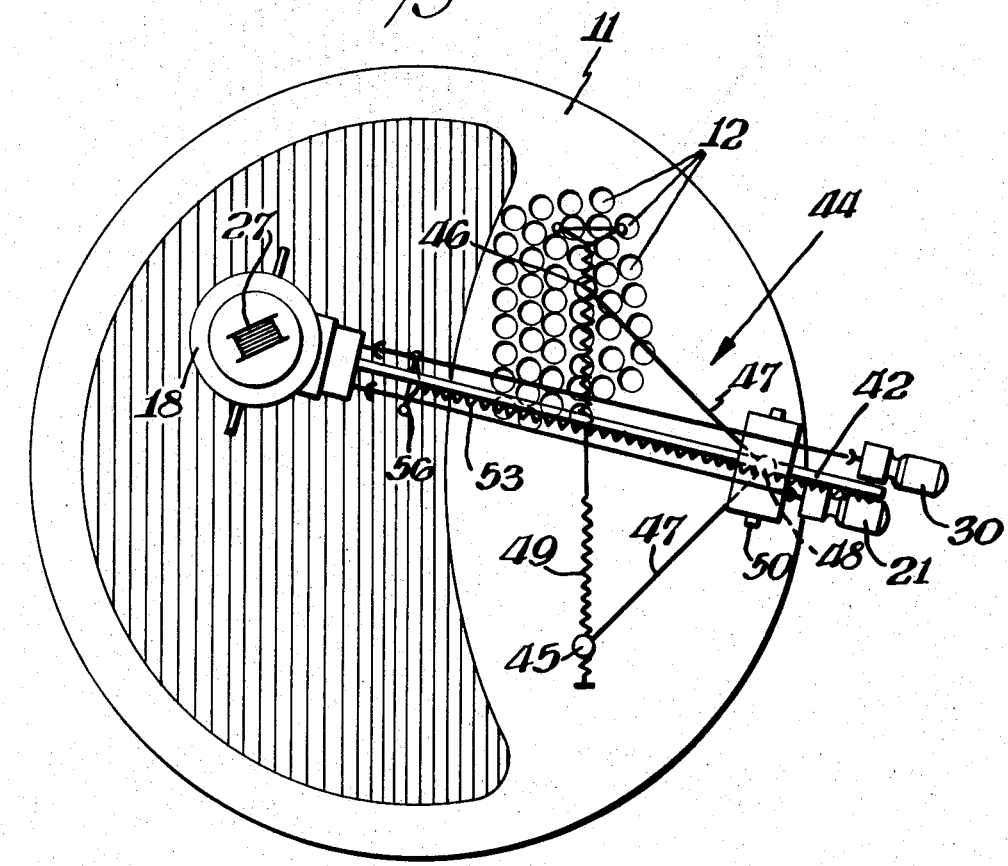

FIG. 1 shows schematically a welding device in accordance with this invention, in side view and partially in section; and FIG. 2 a section along the line II–II of FIG. 1.

According to FIG. 1 the welding head of a device for the welding of tubes or pipes in base plates is designated by 10. A base plate 11 is also shown in FIG. 1. The pipes to be welded in the base plate 11 are partially in view, partially illustrated in cross section and designated by 12.

The welding head 10 has a conical spigot 13 which engages in the pipe to be welded in as the case may be. At the spigot 13 is attached an inclined nozzle 14 which serves for supplying the filler metal to the welding point and if necessary for the supplying of protective gas. A welding wire serving as the filler metal is designated by 15. During the welding process, nozzle 14 together with the entire welding head 10 carries out a turning movement. The turning axis 16 of the welding head in this connection coincides with the center axis 17 of the pipe to be welded. The distance of nozzle 14 from the turning axis 16 is made to be adjustable and conforms to the diameter of pipes 12.

The rotating welding head 10 is mounted in a housing 18. Two support points 19,20 are indicated schematically. The drive of the welding head 10 takes place by means of an electric motor 21 by way of a drive shaft 22 and a bevel gear pair 23,24, which is arranged within housing 18. Drive shaft 22 is supported at two points 25,26.

An advance device for the welding wire 15 is arranged to the rotating welding head 10 and is firmly connected to it. The welding wire advance device consists of a wire coil 27 and two rollers 28,29, between which wire 15 runs through. By means of the stationary connection of welding head and wire advance device 27,28,29, any desired number of welding head rotations is possible without having a distortion of the welding wire take place. Roller 28 is driven and thus effects the supplying of the wire to nozzle 14. The drive of roller 28 takes place by means of an electric motor 30, a drive shaft 31 and spiral toothed spur gears 32,33,34, The drive shaft 31 is supported at the housing 18 at two support points 35,36.

As indicated above the welding head 10 operates faultlessly with respect to the welding wire. In order to assure a completely faultless operation of the welding head, however, terminals for electric current and protective gas should also be considered. The gas supply takes place for example through a housing-tight, schematically indicated, ring conduit 37, which is sealed off opposite the rotating welding head 10. From the ring conduit 37, the gas then reaches into hose 38 and from there to nozzle 14. The welding current connection is also arranged housing-tight and designated by 39. The current transmission to the welding head and the electrode or—with respect to melting off electrode—to the welding wire 15 takes place over slip ring 40 and brush 41.

Since the rotating welding head 10 and its driving members are supported in housing 18, it must be stabilized by a holding device. Housing 18 is attached to a crossbar 42 for this purpose, which in turn is arranged to be longitudinally moving in a bearing 43 of a holding device designated as a whole by 44.

The holding device 44 consists essentially of two pins 45,46 (see also FIG. 2) which by way of rods 47 are arranged individually swingable about a third pin 48. The holding device 44 per se is supported at workpiece 11, where the three pins 45,46,48 engage with already welded pipes 12. A force-locking connection of the holding device with the pipes takes place by bracing against each other of both pins 45,46. As shown in FIG. 2, this bracing takes place by means of a handwheel-operated spindle 49, which has a right-hand and a left-hand thread part.

The connection between the holding device 44 first attached stationarily at the workpiece and the longitudinally movable crossbar 42 is produced by a universal joint 50 which allows a swinging of the crossbar both in the vertical as well as in the horizontal plane. The swingable joint part, which also contains the support 43 for the crossbar 42, is designated in FIG. 1 by 51. The part 51 contains furthermore a spindle nut 52 into which engages a threaded spindle 53. Threaded spindle 53 is supported on the one side at housing 18 in a bearing 54; on the other side in a bearing 55 which is connected with crossbar 42. By turning of the threaded spindle 53 by means of a handwheel 56, a longitudinal movement of crossbar 42 and thus a change of the distance of welding head to holding device can be achieved.

The vertical swinging of the crossbar or of the welding head is initiated by a hydraulic lifting device 57 whose plunger 58 is supported on the workpiece 11 and whose cylinder 59 is connected with housing 18. In order to decrease the required lifting force of the lifting device 57, the already above mentioned driving motors 21,30 are arranged at the crossbar 42 in such a manner that they act at the same time as counterweights opposite the welding head 10 and housing 18.

I claim:

1. In a device for welding tubes to plates, comprising a welding unit, a holding unit, said welding unit being mounted on a rigid crossbar connected to said holding unit, said holding unit including mounting means for fixedly mounting said holding unit on the workpiece per se, means for moving said welding unit with respect to said holding unit whereby said welding unit may operate in different locations on the workpiece while said holding unit is stationary thereon, said mounting means including three pins supported in tubes which have been welded to the plate, said holding unit including a spindle for clamping two of said pins against each other, including universal mounting means connecting said crossbar to said holding unit for swinging movement of said crossbar about two axes perpendicular to each other whereby said welding unit may be mounted in any desired position in the plane of the work surface, one of said axes being a vertical axis coincident with the remaining of said mounting pins, and the other axis being a horizontal axis disposed above said remaining pins.

2. A device as set forth in claim 4 wherein said moving means for controlling the distance between said welding unit and the joint of connection of said crossbar to said holding unit includes a generally horizontal spindle.

3. A device as set forth in claim 2 wherein said moving means includes a support tube connected to said joint, and said crossbar being longitudinally movable in said tube.

4. A device as set forth in claim 1 wherein said moving means includes a worm gear spindle rotatably supported at said welding unit, a spindle nut coupled with said spindle, and said spindle nut being connected with said universal mounting means.

5. A device as set forth in claim 4 wherein said welding unit includes a rotatable welding head, welding wire advance means, driving motor means mounted on said crossbar for rotating said head and advancing the welding wire, and said motor means including drive shafts for transmitting the driving force of the motors.

6. A device as set forth in claim 5 wherein said joint is disposed between said motors and said welding head.

7. A device as set forth in claim 10 including a housing, said welding head being mounted in said housing, said welding head including a centering pin as aligning means, and bearings in said housing for supporting said drive shafts.

8. A device as set forth in claim 7 including gear means in said housing for driving said welding head and said welding wire advance means.

9. A device as set forth in claim 7 including electric terminals in said housing.

10. A device as set forth in claim 9 including lifting means at said housing supported at the workpiece for swinging said crossbar with said welding head attached thereto in a vertical plane.

11. A device as set forth in claim 10 including handles at said housing for swinging said crossbar in said perpendicular planes including said vertical plane.

12. A device as set forth in claim 5 wherein said welding wire advance means is firmly connected with said welding head in its direction of rotation.